United States Patent [19]

Lim

[11] Patent Number: 4,945,013
[45] Date of Patent: Jul. 31, 1990

[54] CAPILLARY MIXING OF IMMISCIBLE LIQUIDS IN A BATTERY CELL

[75] Inventor: Hong S. Lim, Agoura, Calif.

[73] Assignee: Hughes Aircraft Company, Los Angeles, Calif.

[21] Appl. No.: 295,094

[22] Filed: Jan. 9, 1989

[51] Int. Cl.$^5$ .......................................... H01M 10/39
[52] U.S. Cl. .................................... 429/104
[58] Field of Search ............... 429/104, 102, 103, 101, 429/112, 72

[56] References Cited

U.S. PATENT DOCUMENTS

| | | | |
|---|---|---|---|
| 3,811,943 | 5/1974 | Minck et al. | 429/104 |
| 3,883,367 | 5/1975 | Chiku et al. | 429/104 |
| 3,980,497 | 9/1976 | Ludwig et al. | 429/103 |
| 4,076,900 | 2/1978 | Le Mehante et al. | 429/104 X |
| 4,076,902 | 2/1978 | Senoo | 429/104 |
| 4,146,684 | 3/1979 | Fischer et al. | 429/104 |
| 4,492,742 | 1/1985 | Haberfellner et al. | 429/104 |

Primary Examiner—Anthony Skapars
Attorney, Agent, or Firm—Steven M. Mitchell; Robert A. Westerlund; W. K. Denson-Low

[57] ABSTRACT

The conduction of sulfur toward, and reaction products away from, the electrolyte of a sodium sulfur storage cell is accelerated by providing a bimodal capillary in the cathode. The capillary preferably consists of graphite fibers, otherwise present to conduct electricity through the cathode, arranged in a bimodal distribution. Closely spaced fibers preferentially draw the reaction product of the electrical discharge away from the electrolyte by capillary action. Open spaces between groups of closely spaced fibers permit sulfur to flow toward the electrolyte. The capillary mixing technique permits rapid discharge of the battery cell even under weightless conditions.

15 Claims, 2 Drawing Sheets

FIG.4
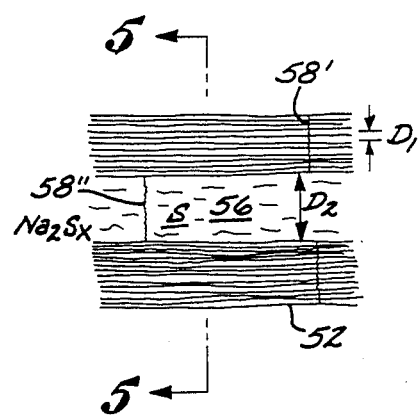
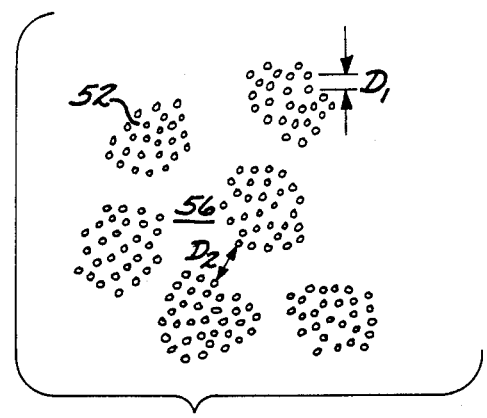
FIG.5

CAPILLARY MIXING OF IMMISCIBLE LIQUIDS IN A BATTERY CELL

This invention was made with Government support under Contract No. F33615-86-C-2619 awarded by the Air Force. The Government has certain rights in this invention.

BACKGROUND OF THE INVENTION

This invention relates to electrical storage cells, and, more particularly, to sodium sulfur cells for use in a weightless environment.

Rechargeable cells or batteries are electrochemical devices for storing and retaining an electrical charge and later delivering that charge for useful power. Familar examples of the rechargeable cell are the lead-acid cell used in automobiles and the nickel-cadmium cell used in various portable electronic devices such as cameras and radios. Another type of cell having a greater storage capacity for its weight is the nickel oxide pressurized hydrogen cell, known as the nickel-hydrogen cell, which is used in spacecraft.

Yet another type of cell is the sodium sulfur cell, which has been under development for about 20 years for use in a variety of terrestrial applications such as nonpolluting electric-powered vehicles and utility load levelling. The sodium sulfur cell has the particular advantage that its storage capacity per unit weight of cell is nearly three times, and in some designs as much as five times, the storage capacity of the nickel-hydrogen cell. The sodium sulfur cell therefore is an attractive candidate for use in spacecraft.

The most common type of construction for a sodium sulfur cell includes a cylindrical metal outer housing which serves as a positive terminal, and a cylindrical shell of sodium beta/beta-double prime alumina ceramic within the metal housing. Sodium is placed into a first or inner chamber formed within the alumina shell, and sulfur is placed into a second chamber formed between the alumina shell and the outer housing. The cell is heated to a temperature of about 350° C., at which temperature both the sodium and the sulfur are molten. The liquid sodium acts as the anode of the cell, the liquid sulfur acts as the cathode, and the solid beta/beta-double prime alumina ceramic acts as the electrolyte. Electrical energy is released when sodium ions diffuse through the ceramic into the sulfur, thereby forming sodium polysulfides. Electrical energy can be stored when the process is reversed, with an applied voltage causing the sodium polysulfides to decompose to yield sodium and sulfur. The sodium ions diffuse through the ceramic electrolyte back into the first chamber.

The sodium sulfur cell is a candidate for use in energy storage for spacecraft such as communications satellites. A satellite orbiting the earth is periodically exposed to direct sunlight and then plunged into shadow. In many satellites, electrical energy to power the systems on board the satellite is created by solar cells that function when the satellite is in sunlight, and some of the energy so generated is stored in electrical storage cells. The stored energy is then available for use when the satellite is in the earth's shadow or for peak power demands, by discharging the cells.

Nickel-cadmium and nickel-hydrogen electrical storage cells are currently used in many satellite applications. Such cells have the capacity to store about 17-18 watt hours per pound of cell weight, or less. A sodium sulfur cell has the capacity to store over 50 watt hours per pound of cell weight using existing cell designs. In one example, about 670 pounds of nickel-hydrogen cells are required in a communications satellite to meet its storage needs. If the nickel-hydrogen cells were replaced by sodium sulfur cells, the weight of storage cells would be reduced to about 250 pounds. The weight of the cells is included in the cost of launching the satellite, which presently is on the order of $20,000 per pound, and a potential reduction of over 400 pounds is highly significant.

Although sodium sulfur cells offer potential benefits in spacecraft applications, their operation has been established only on earth. A key difference between operation in a terrestrial environment and in a spacecraft is the absence of gravity in space. It has been determined that the absence of gravity may have significant adverse effects on the functioning of the cell, particularly under fast discharge conditions, that are not experienced in earthbound applications. For example, the rate of discharge is important in satellites orbiting in low earth orbit, as the relatively short periods of time in shadow and applications power needs require the batteries to deliver their stored energy rapidly. There is a need to develop an approach to avoiding the expected adverse effects of weightlessness on the ability of the cells to discharge rapdily. The present invention fulfills this need, and further provides related advantages.

SUMMARY OF THE INVENTION

The present invention provides an electrical storage cell that is capable of rapid discharge of energy even in a weightless environment. The construction and operation of the cell are not changed in a radical manner in order to accomplish the improved discharge characteristics. There is no increase in weight and little, if any, increase in cost of the improved cell. The invention is of particular utility in sodium sulfur storage cells, where there are immiscible liquids in the cathode. The improved cells achieve an increased rate of discharge in a weightless environment and also in a gravitational field, although the improvement in a weightless environment is more significant for applications purposes.

In accordance with the invention, a sodium sulfur electrical storage cell comprises a sodium anode; a sulfur cathode; a solid ceramic electrolyte separating the sodium anode and the sulfur cathode; means for conducting an electrical current from the cathode to an external electrical connection; and means for circulating sulfur toward the electrolyte and moving reaction products away from the electrolyte through the cathode during discharge of the cell, the means for circulating being operable in a weightless environment. Desirably, the means for circulating would also be operable in a gravitational field, but in that situation other mechanisms can contribute to the circulation of sulfur and reaction products.

When a sodium sulfur cell discharges, sodium ions diffuse through the solid beta beta-double prime alumina electrolyte to the cathode. At the cathode, the sodium ions react with sulfur ions to produce sodium sulfide, which is immiscible in the sulfur. A layer or mass of sodium sulfide builds up in the cathode adjacent the electrolyte, preventing further sulfur from reaching the cathode/electrolyte interface. As a result, the discharge is slowed significantly due to a shortage of the sulfur reactant.

Where gravity is present, normal convection currents stir the liquid cathode, carrying the sodium polysulfide reaction products away from, and fresh sulfur to, the cathode/electrolyte interface so that the discharge reaction may continue. The stirring may be sluggish but sufficient in a gravitational field, but in a weightless environment there is no natural convection and no other driving force for mixing. The mechanism that achieves mixing on earth simply cannot be relied upon in a cell used in space.

The present invention provides another technique for circulating the reaction products away from the electrolyte, and sulfur to the electrolyte. Preferably, a capillary is incorporated into the cathod that creates a capillary force drawing the reaction products away from the electrolyte, so that sulfur may flow into the vacated space. In existing cells, a wool of electrically conductive graphite fibers is present in the cathode chamber to conduct electrical charge through the otherwise nonconducting cathode to the electrolyte.

It has been discovered that there is a capillary driving force for the migration of the sodium sulfide reaction products when the graphite fibers are closely spaced. The preferred capillary is therefore a bimodal distrubtion of graphite fibers wherein the fibers are bundled closely together, and there is open space between the fiber bundles. The sodium polysulfide reaction product is drawn away from the electrolyte in the fiber bundles through capillary force. As the sodium sulfide leaves the vicinity of the electrolyte, sulfur flows in the reverse direction toward the electrolyte through the spaces between the fiber bundles to fill the space vacated by the reaction product, creating a circulation of sulfur to the electrolyte/cathode interface. This mechanism can be used to accelerate discharge capability in terrestrial cells as an adjunct to convection circulation, but is required in a weightless environment where convection is absent.

The present invention provides an important advance in the art of cells for use in a weightless environment and a terrestrial environment. Other features and advantages of the present invention will be apparent from the following more detailed description of the preferred embodiment, taken in conjunction with the accompanying drawings, which illustrate, by way of examples, the principles of the invention.

BRIEF DESCRIPTION OF THE DRAWINGS

FIG. 4 is a schematic illustration of a bimodal distribution of graphite fibers in longitudinal view; and FIG. 5 is a schematic illustrations of the bimodal distribution of graphite fibers in cross section, taken along line 5—5 of FIG. 4.

DETAILED DESCRIPTION OF THE INVENTION

Figure 1:
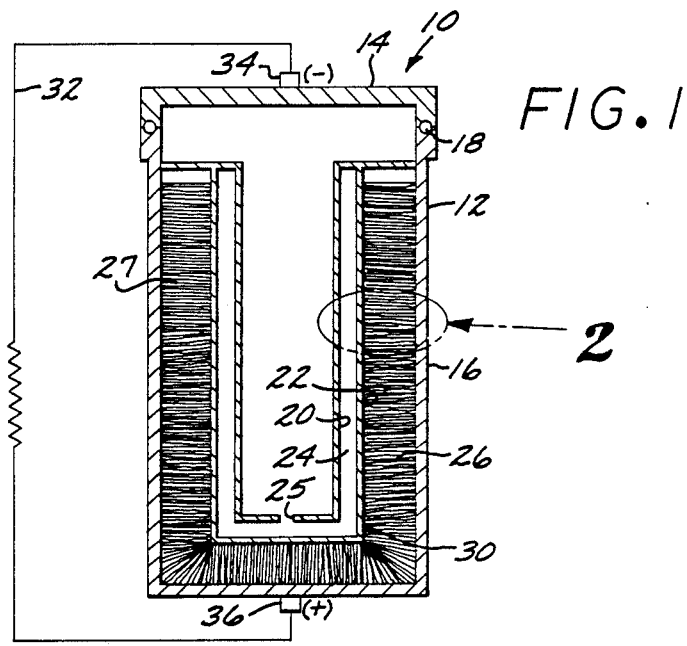
FIG. 1 is a side sectional drawing of a sodium sulfur cell of the invention.

A presently preferred form of a sodium sulfur cell 10 of the invention is illustrated in FIGS. 1 and 3-5. (The preferred embodiment is shown in relation to a central sodium cell design. Central sulfur designs are also operable, and the present invention can be used equally well in such cells.) The cell 10 includes an outer cylindrical housing 12 (also termed the first cylindrical shell) in which the other components of the cell are contained. To permit assembly, the housing 12 has a top portion 14 and a bottom portion 16, with a seal 18 between them. After assembly, the housing 12 is hermetically sealed. Within the housing 12 is a cylindrical protection tube 20 (also termed the second cylindrical shell) dimensioned to fit within, and disposed to be coaxial with, the housing 12.

An electrolyte 22 is a solid ceramic in the form of a third cylindrical shell that is coaxial with, and disposed between, the housing 12 and the protection tube 20. The electrolyte 22 is a ceramic material that permits the rapid diffusion of sodium ions therethrough. It is of a composition known in the art, see for example the publication Proceedings of the Symposium on Sodium-Sulfur Batteries, edited by Albert R. Landgrebe, Robert D. Weaver, and Rajat K. Sen, published by The Electrochemical Society, 1987, and particularly the contribution "Sodium Sulfur Battery: An Overview" by Rajat K. Sen and Albert Landgrebe at pages 1-9 thereof, whose disclosure is incorporated herein by reference.

The electrolyte is a mixture of beta and beta-double prime alumina, with the major fraction or all of the electrolyte being the lower resistivity beta-double prime phase. (Both beta alumina and beta-double prime alumina are thought to be crystallographic variations of the composition $(Na_2O)_{1+x} 11\ Al_2O_3$ with a small amount of lithium oxide, although the precise form is still not settled. The operability of the present invention is not dependent upon any particular composition of electrolyte, however.) In its most preferred form as used in the present invention, the ceramic electrolyte 22 is of a composition of about 90% aluminum oxide, 9% sodium oxide, and 1 percent lithium oxide, which is the beta-double prime alumina composition. (All compositions herein are in percent by weight, unless otherwise indicated.)

Elemental sodium is contained within the protection tube 20. At one end of the protection tube 20 is an orifice 25 through which the interior of protection tube 20 communicates with the volume between the protection tube 20 and the electrolyte 22, termed the first chamber 24. When molten, the sodium flows from within the protection tube 20, through the orifice 25, and into the first chamber 24. Elemental sulfur is contained within the volume between the housing 10 and the electrolyte 22, termed the second chamber 26.

Additionally, the second chamber 26 is filled with electrically conductive graphite fibers 27. In the prior approach, illustrated in FIG. 2, the fibers 27 are in the form of a felt 28. The graphite fibers 27 provide electrical conductivity through the second chamber 26, which is necessary to conduct electrons between the electrolyte 22 and the outer housing 12. Sulfur and reaction products of the sulfur/sodium reaction have little electrical conductivity. The density of graphite fibers in the felt 28 is such that the sulfur, when molten, is free to flow through the felt 28.

Figure 2:
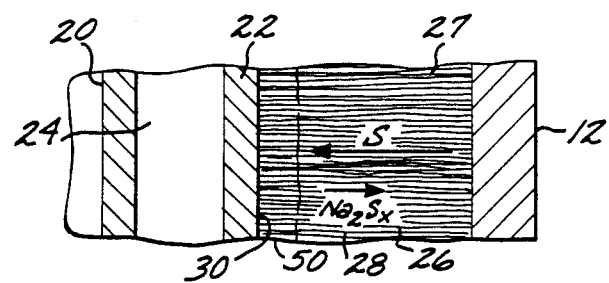
FIG. 2 is an enlargement of a detail of FIG. 1, illustrating a section through the region adjacent the electrolyte in the absence of convection in the cathode.
Figure 3:
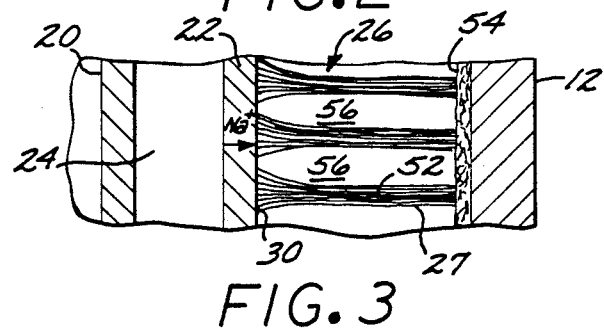
FIG. 3 is similar to FIG. 2, except with the presence of capillary mixing in accordance with the invention.

The region of the cell 10 adjacent the electrolyte 22 is illustrated in more detail in FIGS. 2 and 3. During operation, the cell 10 is heated to a temperature at which the sulfur and the sodium are molten, preferably about 350° C. Molten sodium cations flow into the first chamber 24. Sodium cations diffuse through the electrolyte 22 from the first chamber 24 toward the second chamber 26. Upon reaching the second chamber 26, the sodium cations combine with sulfur anions at, and immediately adjacent, an outer surface 30 of the electrolyte 22.

The half-cell reactions for discharge are $$2Na = 2Na^+ + 2e^-$$

$$xS + 2e^- = (S_x)^{-2}.$$

The total reaction of the cell is therefore $$2Na + xS = Na_2S_x.$$

The electrons flow through an external circuit during the reaction. The reaction is presented in this general form because the sodium polysulfide $Na_2S_x$ may be present in several forms, depending upon the degree of discharge of the cell 10. With increasing degrees of discharge, the sequence of the sodium polysulfide produced is $Na_2S_5$, $Na_2S_4$, and $Na_2S_3$.

From the total cell reaction, it is apparent that sulfur must be provided at the reaction site, and sodium polysulfide must be removed from the region of the reaction. Under conditions of a slow discharge in a gravitational field or terrestrial environment, the movements of sulfur toward the electrolyte and polysulfide away from the electrolyte are driven by convection, which is much less efficient than is the capillary mixing action of the invention. The convection is due primarily to the difference in density of $Na_2S_x$ and sulfur melts, which are both present in the cathode and are immiscible. The sodium polysulfide formed at the surface 30 sinks in a gravitational field, and the sulfur melt rises to compensate for the flow of the sodium polysulfide. This convection mechanism separates the two liquid phases temporartily until the cell is recharged, with the result that convection is a less efficient means of mixing than capillary mixing.

In a weightless environment, there is no gravity to create convection currents, with the result that the sodium polysulfide forms a boundary layer 50 adjacent the outer surface of the electrolyte 30. That is, the reaction product builds up in the reaction zone, preventing sulfur from entering the reaction zone and forcing the overall reaction to the left. The ability of the cell 10 to discharge is thereby inhibited, particularly when there is an attempt to discharge the cell at a high rate. The rate of discharge becomes limited by the buildup of reaction product and unavailability of the sulfur reactant at the outer surface 30. The only mechanism to overcome this inhibition of the reaction is diffusion of the polysulfides and of the sulfur, a slow process at the relatively low temperatures of the reaction.

When the cell 10 is charged, the reverse reactions and difficulties occur.

The sodium is the anode of the cell defined by the overall cell reaction, and is electrically connected to an external negative electrode terminal 34 in the top portion 14 of the housing 12 of the cell 10. The sulfur is the cathode of the cell defined by this reaction, and is electrically connected to an external positive electrode terminal 36 in the bottom portion 16 of the housing 12 of the cell 10. The cell can be charged or discharged through the external circuit 32 connecting to the terminals 34 and 36. The graphite fibers in the felt 28 help to carry the electrical current from the point of the electrochemical reaction, near the outer surface 30 of the electrolyte, through the second chamber 26 to the housing 12 and thence to the positive electrode terminal 36. No such aid is required to conduct current through the molten sodium, where current is carried by metallic conduction.

Some further details of the construction of the most preferred form of the cell 10 are provided for illustrative purposes, but are not to be taken as limiting of the invention, as the invention may equally well be applied to other forms of the cell. The overall length of the cell 10 is about 10 inches, and the outer diameter of the housing 12 is about 1-⅜ inches. The housing 12 is formed of chromium coated stainless steel or molybdenum, which are resistant to corrosion by the sulfur, about 0.020 inches thick. The protection tube 20 is formed of stainless steel, about 0.015 inches thick. The electrolyte is the previously described ceramic material about 1 millimeter thick. The first chamber 24, the space between the outer diameter of the protection tube 20 and the inner diameter of the electrolyte 22, is about 0.020 inches wide. The second chamber 26, the space between the outer diameter of the electrolyte 22 and the inner diameter of the housing 12, is about 0.170 inches wide.

The cell 10 of the invention produces an open circuit voltage of about 2.08 volts over most of its capacity. The cell having the preferred dimensions and characteristics just described has a capacity of about 40 Ampere-hours. In normal spacecraft construction, a number of the individual cells are connected together in an appropriate fashion to provide power of the required voltage and capacity.

In accordance with the present invention, a sodium sulfur electrical storage cell comprises a cell housing having a first chamber and a second chamber therein; a sodium anode within the first chamber of the housing; a sulfur cathode within the second chamber of the housing; a solid ceramic electrolyte separating the sodium anode and a sulfur cathode; and means for conducting an electrical current from the cathode to an external electrical connection and for circularting sulfur toward the electrolyte and moving reaction products away from the electrolyte through the cathode during discharge of the cell, the means for circulating being operable in a weightless environment. Preferably, the means for conducting and for circulating includes a first capillary region wherein the reaction products experience a capillary force that is sufficiently large that the reaction products move away from the electrolyte, and a second capillary region wherein the reaction products experience a capillary force that is sufficiently small that the mass counterflow of sulfur resulting from movement of reaction products in the first capillary region overcomes the capillary force, and the sulfur moves toward the electrolyte. As used herein, the "reaction products" are the previously discussed $Na_2S_x$ sodium polysulfides produced during discharge.

Most preferably, the means for conducting and for circulating is a bimodal distribution of the carbon fibers, wherein the fibers are grouped into bundles having unoccupied space therebetween. In one approach, the spacing between fibers in the bundles is from about 0.002 to about 0.020 inches, and the unoccupied space has a dimension between bundles of more than about 0.040 inches.

FIGS. 3-5 sillustrate the present approach utilizing bundles of fibers. In FIG. 3, the graphite fibers 27 are arranged into bundles 52, which are anchored to a bundle base 54 supported on the outer housing 12. The bundles 52 have open space 56 between them. One end of the graphite fibers of the bundles 52 is positioned adjacent the outer surface of the electrolyte 30, and the other end is positioned in contact with the inner surface of the outer housing 12. The graphite fibers in the bundles 52 therefore are positioned to carry an electrical current flow between the outer surface of the electrolyte 30 and the positive electrode 36.

It has now been found that sodium polysulfide preferentially wets the graphite fibers 27, and arranging the fibers 27 in bundles 56 creates a capillary force tending to move the sodium polysulfide along the fibers. By way of simplified example presented to illustrate the mechansim, when a fiber bundle 56 is immersed in a system containing the insoluble polysulfide and sulfur melts, the result is a capillary force driven displacement of the interface 58 between the phases, in response to the capillary forces. As illustrated in FIG. 4, with the polysulfide ($Na_2S_x$) phase on the left and the sulfur (S) phase on the right, in the same relationship as in the bondary layer 50 of FIG. 2, that portion of the interface 58' which is within the bundles 52 is forced further to the right than is the portion 58" that is within the open space 56. The reason for this relative movement is that the capillary force is inversely proportional to the spacing between the capillary walls, and the spacing $D_1$ between the fibers in the bundles 52 is much smaller than th spacing $D_2$ between the bundles, which characterizes the dimension of the open space 56. Although $D_1$ and $D_2$ are not firmly fixed quantities within and between the fiber bundles, $D_1$ is generally smaller than $D_2$.

Thus, the capillary force causes that portion of the sodium polysulfide liquid within the bundles 52 to flow away from the electrolyte 22. At the same time, because the volume of liquid in the system is conserved, liquid sulfur flows toward the electrolyte in the open spaces 56, where the capillary force is much smaller. The capillary force in the open spaces does tend to force the sodium polysulfide away from the electrolyte, but the capillary driving force is much smaller and is overcome by the pressure from the sulfur forced toward the electrolyte due to conservation of volume. The flow of sodium polysulfide and sulfur is continuous as long as discharge continues, and its rate increases as the discharge rate increases. It creates a circulation that brings fresh sulfur to the outer surface of the electrolyte 30, where it reacts with sodium ions that diffuse through the electrolyte 22, and removes the reaction product sodium polysulfide from the neighborhood of the outer surface 30. Any boundary layer 50 of the type illustrated in FIG. 2 therefore cannot be maintained, and mixing is assured.

The capillary mixing technique of the invention is particularly useful when employed in a sodium sulfur cell to be used in a weightless environment, because there is no other rapid mixing process operable in the absence of gravity. The approach can also be used in cells operating in a terrestrail environment, to supplement mixing produced by convection.

The fibers that form the bundles are preferably graphite, which is electrically conducting and is preferentially wet by the sodium polysulfide in preference to the sulfur, so that an unbalanced capillary force is created. The speeding $D_1$ between the fibers within the bundles 52 is preferably from about 0.002 to about 0.020 inches. Smaller spacings cause higher capillary forces, but the flow resistance becomes so great that the flow of sodium polysulfide is reduced. Larger spacings reduce the capillary force below an effective level. The spacing $D_2$ of the bundles from each other is preferably more than about 0.040 inches, so that the capillary force is reduced to a sufficiently low level that the sulfur can flow toward the electrolyte.

Capillaries other than fiber bundles are also acceptable, as long as they permit the circulation flow described previously. A solid walled honycomb type structure having a bimodal distribution of small and large cells is an acceptable substitute for the fiber bundles, for example.

In the preferred embodiment, graphite fibers are used, and the sodium polysulfide is drawn by capillary action. The invention is equally applicable to other embodiments wherein other sources for the capillary action are used. In some instances, the sulfur is preferentially drawn by the capillary action toward the electrolyte, and the sodium polysulfide flows away from the electrolyte. Surface-treated graphite fibers or other forms and compositions of materials may be suitable for this purpose.

The present invention also provides a process for operating an electrical storage cell in a weightless environment. A process for releasing previously stored electrical energy in a weightless environment comprises the steps of furnishing a sodium sulfur electrical storage cell, the cell including a sodium anode, a surfur cathode, a solid ceramic electrolyte separating the sodium anode and the sulfur cathode, and means for conducting an electrical current from the cathode to an external electrical connection and for circulating sulfur toward the electrolyte and moving reaction products away from the electrolyte through the cathode during discharge of the cell; heating the electrical storage cell to a temperature of at least about 300° C. in a weightless environment; and permitting sodium cations to diffuse from the sodium anode to the sulfur cathode, through the solid ceramic electrolyte, while conducting electricity through the cathode and circulating sulfur toward the electrolyte and reaction products away from the electrolyte.

According to this process, a sodium sulfur cell such as that previously described is heated in a weightless environment to a temperature whereat the sodium, the sulfur, and the sodium polysulfides are molten. Temperatures in the range of 300°–350° C. are preferred.

Although a particular embodiment of the invention has been described in detail for purposes of illustration, various modifications may be made without departing from the spirit and scope of the invention. Accordingly, the invention is not to be limited except as by the appended claims.

What is claimed is:

1. A sodium sulfur electrical storage cell, comprising:
   a sodium anode;
   a sulfur cathode;
   a solid ceramic electrolyte separating the sodium anode and the sulfur cathode;
   means for conducting an electrical current from the cathode to an external electrical connection; and
   means for circulating sulfur toward the electrolyte and moving reaction products away from the electrolyte through the cathode during discharge of the cell, the means for circulating being operable in a weightless environment.

2. The sodium sulfur electrical storage cell of claim 1, further including a housing in which the anode, the cathode, the electrolyte, the means for conducting, and the means for circulating are enclosed, wherein the housing includes a first chamber in which the anode is contained, and a second chamber in which the cathode is contained, and wherein the means for circulating is in the second chamber.

3. The sodium sulfur electrical storage cell of claim 1, wherein the means for circulating includes
   a first capillary region wherein the reaction products experience a capillary force that is sufficiently large that the reaction products move away from the electrolyte, and
   a second capillary region wherein the reaction products experience a capillary force that is sufficiently small that the mass counterflow of sulfur resulting from movement of reaction products in the first capillary region overcomes the capillary force, and the sulfur moves toward the electrolyte.

4. The sodium sulfur electrical storage cell of claim 1, wherein the functions of the same for conducting and the means for circulating are both provided by a single element.

5. The sodium sulfur electrical storage cell of claim 1, wherein
   the means for conducting is carbon fibers, and
   the means for circulating is a bimodal distribution of the carbon fibers, wherein the fibers are grouped into bundles having unoccupied space therebetween.

6. The sodium sulfur electrical storage cell of claim 5, wherein the carbon is present in the form of graphite.

7. The sodium sulfur electrical storage cell of claim 1, wherein the electrolyte is a solid ceramic consisting essentially of a mixture of aluminum oxide, sodium oxide, and lithium oxide.

8. A sodium sulfur electrical storage cell, comprising:
   a cell housing having a first chamber and a second chamber therein;
   a sodium anode within the first chamber of the housing;
   a sulfur cathode within the second chamber of the housing;
   a solid ceramic electrolyte separating the sodium anode and a sulfur cathode; and
   means for conducting an electrical current from the cathode to an external electrical connection and for circulating sulfur toward the electrolyte and moving reaction products away from the electrolyte through the cathode during discharge of the cell, the means for circulating being operable in a weightless environment.

9. The sodium sulfur electrical storage cell of claim 8, wherein the means for conducting and for circulating includes
   a first capillary region wherein the reaction products experience a capillary force that is sufficiently large that the reaction products move away from the electrolyte, and
   a second capillary region wherein the reaction products experience a capillary force that is sufficiently small that the mass counterflow of sulfur resulting from movement of reaction products in the first capillary region overcomes the capillary force, and the sulfur moves toward the electrolyte.

10. The sodium sulfur electrical storage cell of claim 8, wherein
    the means for conducting and for circulating is a bimodal distribution of the carbon fibers, wherein the fibers are grouped into bundles having unoccupied space therebetween.

11. The sodium sulfur electrical storage cell of claim 10, wherein the carbon is present in the form of graphite.

12. The sodium sulfur electrical storage cell of claim 8, wherein the electrolyte is a solid ceramic consisting essentially of a mixture of aluminum oxide, sodium oxide, and lithium oxide.

13. A sodium sulfur electrical storage cell, comprising:
    a sodium anode;
    a sulfur cathode;
    a solid ceramic electrolyte separating the sodium anode and the sulfur cathode; and
    a bimodal distribution of graphite fibers in the sulfur cathode adjacent the solid ceramic electrolyte, wherein the fibers are grouped into bundles having unoccupied space therebetween, the spacing between fibers in the bundles being from about 0.002 to about 0.020 inches, and the unoccupied space having a dimension between bundles of more than about 0.040 inches.

14. The sodium sulfur electrical storage cell of claim 13, wherein the distribution of graphite fibers is provided as a woven array.

15. The sodium sulfur electrical storage cell of claim 13, wherein the electrolyte is a solid ceramic consisting essentially of a mixture of aluminum oxide, sodium oxide, and lithium oxide.

* * * * *